United States Patent
Von Lerber

(10) Patent No.: US 7,574,143 B2
(45) Date of Patent: Aug. 11, 2009

(54) ALL-OPTICAL SIGNAL PROCESSING METHOD AND DEVICE

(75) Inventor: Tuomo Von Lerber, Helsinki (FI)

(73) Assignee: Luxdyne Oy, Helsinki (FI)

( * ) Notice: Subject to any disclaimer, the term of this patent is extended or adjusted under 35 U.S.C. 154(b) by 494 days.

(21) Appl. No.: 11/219,802

(22) Filed: Sep. 7, 2005

(65) Prior Publication Data

US 2006/0024065 A1     Feb. 2, 2006

Related U.S. Application Data

(63) Continuation-in-part of application No. PCT/FI03/00848, filed on Nov. 7, 2003.

(51) Int. Cl.
*H04B 10/00* (2006.01)
*H04B 10/06* (2006.01)

(52) U.S. Cl. .................. 398/155; 398/175; 398/178; 398/180; 398/212; 398/214

(58) Field of Classification Search .................. 398/155, 398/178, 180, 175, 212, 214
See application file for complete search history.

(56) References Cited

U.S. PATENT DOCUMENTS

| | | | |
|---|---|---|---|
| 4,737,970 A | 4/1988 | Viola et al. | |
| 5,339,185 A | 8/1994 | Kaede | |
| 5,446,573 A | 8/1995 | Lomashevitch et al. | |
| 5,761,228 A * | 6/1998 | Yano | 372/26 |
| 6,028,687 A | 2/2000 | Cremer | |
| 6,388,753 B1 | 5/2002 | Hall et al. | |
| 7,116,917 B2 * | 10/2006 | Miyamoto et al. | 398/185 |
| 7,162,162 B2 * | 1/2007 | Lee et al. | 398/155 |
| 2006/0061402 A1 * | 3/2006 | Lee et al. | 327/291 |

OTHER PUBLICATIONS

Xiang Zhou et al., "A Performance Analysis of an All-Optical Clock Extraction Circuit Based on Fabry-Perot Filter," Journal of Lightwave Technology, vol. 19, No. 5, May 2001, pp. 603-613.*
L.F. Mollenauer, "Method for Nulling Nonrandom Timing Jitter in Soliton Transmission," Mar. 1996, Optics Letter, vol. 21, No. 6, pp. 384-386.*
Masahiko Jinno and Takao Matsumoto; Optical Tank Circuits Used for All-Optical Timing Recovery; IEEE Journal of Quantum Electronics; Apr. 1992; pp. 895-900; vol. 28 No. 4.
H.K. Lee, J.T. Ahn, M.-Y. Jeon, K.H. Kim, D.S. Lim and C.-H. Lee; All-Optical Clock Recovery from NRZ Data of 10 Gb/s; IEEE Photonics Technology Letters; Jun. 1999; pp. 730-732; vol. 11 No. 6.

(Continued)

*Primary Examiner*—Ken N Vanderpuye
*Assistant Examiner*—Daniel G Dobson
(74) *Attorney, Agent, or Firm*—Venable LLP; Eric J. Franklin

(57) ABSTRACT

A device for processing of an optical input signal includes at least a first data signal. A first optical resonator provides a reference signal by optical filtering of the optical input signal. The first optical resonator is matched with a predetermined reference wavelength of the first data signal. A second optical resonator provides a sideband signal by optical filtering of the optical input signal. The second optical resonator is non-matched with the predetermined reference wavelength of the first data signal. An optical combiner combines the sideband signal with the reference signal to form an optical output signal.

45 Claims, 13 Drawing Sheets

OTHER PUBLICATIONS

José Azaña and Lawrence R. Chen; Multwavelength Optical Signal Processing Using Multistage Ring Resonators; IEEE Photonics Technology Letters; May 2002; pp. 654-656; vol. 14 No. 5.

G. Lenz et al.; Dispersive Properties of Optical Filters for WDM Systems; IEEE Journal of Quantum Electronics; Aug. 1998; pp. 1390-1402; vol. 34 No. 8.

* cited by examiner

ALL-OPTICAL SIGNAL PROCESSING METHOD AND DEVICE

CROSS-REFERENCE TO RELATED APPLICATIONS

This application is a continuation-in-part of PCT/FI2003/000848 filed 7 Nov. 2003, the entire contents of the disclosure of which is hereby incorporated by reference.

FIELD OF THE INVENTION

The present invention relates to optical signal processing.

BACKGROUND OF THE INVENTION

Signals have been traditionally processed in the electrical domain. However, conversion of optical signals to electrical signals is non-trivial at high modulation frequencies. Optical processing of optical signals provides an efficient and cost-effective approach at high modulation frequencies, e.g. when the modulation frequency is in the order of 40 GHz or higher.

Optical signal processing may be used e.g. for the recovery of clock frequency from an optical data signal.

The article "Optical Tank Circuits Used for All-Optical Timing Recovery", by M. Jinno and T. Matsumoto, IEEE Journal of Quantum Electronics Vol. 28, No. 4 April 1992, pp. 895-900, discloses a method for optical clock recovery. An optical clock signal synchronized to an incoming data stream is generated by extracting line spectral components in the incoming data stream using an optical resonator whose free spectral range is equal to the incoming data bit rate.

SUMMARY OF THE INVENTION

The object of the invention is to provide an optical signal processing device and an optical signal processing method.

According to an aspect of the invention, there is a method to process an optical input signal comprising at least a first data signal, said method comprising:
  optical filtering of said optical input signal by using a first optical resonator to provide a reference signal, said first optical resonator being substantially matched with a predetermined reference wavelength of said first data signal,
  optical filtering of said optical input signal by using a second optical resonator to provide a sideband signal, said second optical resonator being substantially non-matched with said predetermined reference wavelength of said first data signal, and
  optically combining said reference signal with said sideband signal to form an optical output signal.

An optical resonator is a device which has a capability to wavelength-selectively store optical energy carried at one or more wavelengths. Because the optical resonator has the capability to store optical energy, an optical output signal may be provided also during periods when no optical energy is coupled to the optical resonators.

When the optical input signal comprises several data signals, the method according to the present invention allows considerable freedom to select the spectral positions of the data signals and/or the clock frequencies of the data signals.

In an embodiment, the device and the method may be used to recover at least one clock frequency associated with the optical input signal.

DETAILED DESCRIPTION OF THE INVENTION

Figure 1:
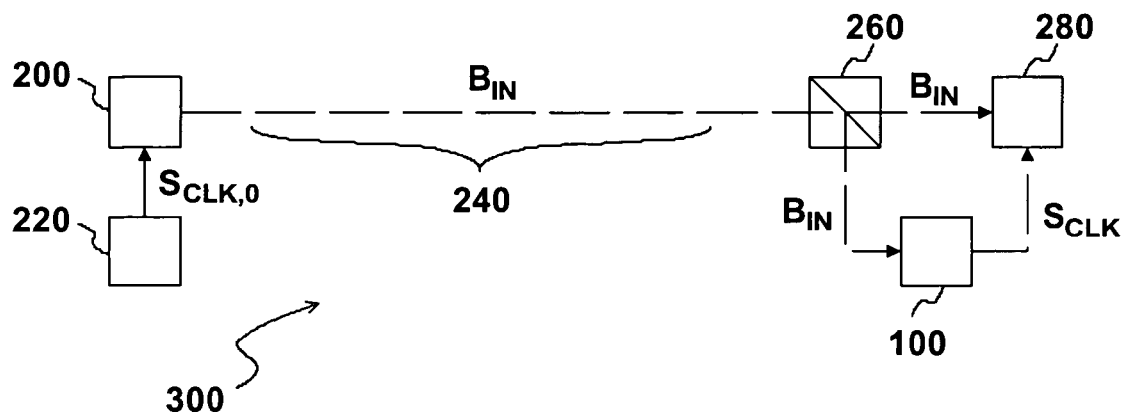
FIG. 1 shows a block diagram of an optical communication system.

Referring to FIG. 1, an optical communication system 300 comprises an optical transmitter 200, an optical receiver 280 and an optical transmission path 240. The optical transmission path 240 may be e.g. an optical fiber. The optical signal $B_{IN}$ sent by the transmitter 200 is carried through the transmission path 240. The modulation of the optical signal $B_{IN}$ is controlled by a clock signal $S_{CLK,0}$ provided by a clock 220. The optical communication system 300 may comprise a splitter 260 to divide the optical signal $B_{IN}$ into parts. The clock 220 may be a part of the transmitter 200. In case of multichannel transmission, the clock signal $S_{CLK,0}$ may consist of several signals having different frequencies.

The optical signal $B_{IN}$ may be processed using optical signal processing device 100 according to the present invention.

Advantageously, the optical signal processing device 100 according to the present invention is used to recover at least one clock signal $S_{CLK}$ associated with the optical signal $B_{IN}$. The receiver 280 may be synchronized with the optical signal $B_{IN}$ by using the recovered one or more clock signals $S_{CLK}$.

Figure 2:
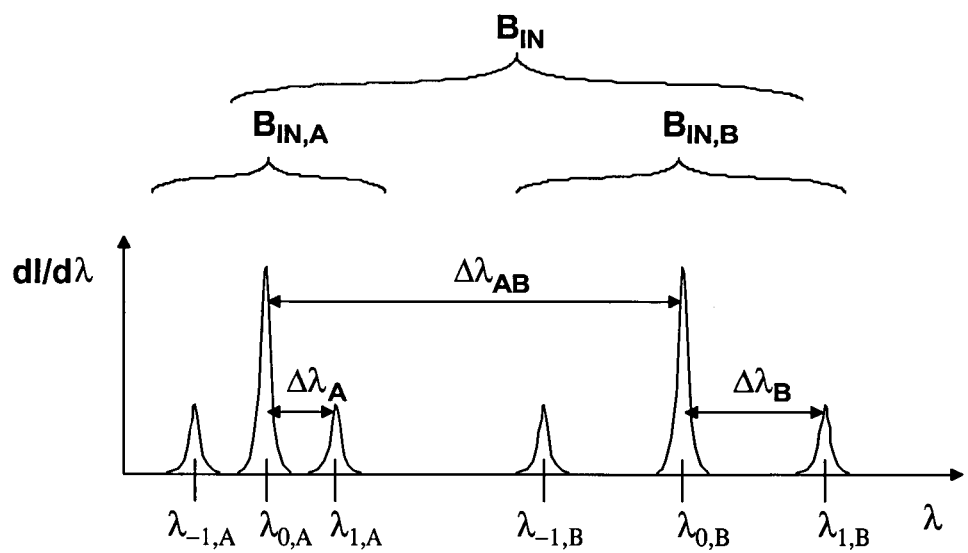
FIG. 2 shows, by way of example, the spectral composition of an optical signal comprising two modulated data signals

Referring to FIG. 2, an optical signal $B_{IN}$ may consist of several modulated data signals $B_{IN,A}$, $B_{IN,B}$.

Modulation of a signal generates one or more spectral sidebands. Typically, a modulated data signal exhibits of a spectral component at a carrier wavelength and two spectral components at sideband wavelengths. For example a data signal modulated according to the return to zero (RZ) format exhibits a spectral composition belonging to this category.

However, the spectral component at the carrier wavelength may also be suppressed in order to save bandwidth and/or signal power.

Herein, in those cases when the spectral component at the carrier wavelength is not substantially suppressed, the term "reference wavelength" refers to the carrier wavelength of a modulated signal. In those cases when the spectral component at the carrier wavelength is substantially suppressed, the term "reference wavelength" refers to one of the sideband wavelengths.

"Sideband wavelength" refers to an other of the sideband wavelengths such that the sideband wavelength is different from the reference wavelength. Spectral components manifest themselves as spectral peaks in frequency plots.

In FIG. 2, the modulated data signal $B_{IN,A}$ has a spectral component at the reference wavelength $\lambda_{0,A}$, and two sideband components at the wavelengths $\lambda_{-1,A}$, $\lambda_{1,A}$, on both sides of the reference wavelength $\lambda_{0,A}$. The wavelength $\lambda_{1,A}$ may be selected to be the sideband wavelength.

Respectively, the modulated data signal $B_{IN,B}$ has a spectral component at the reference wavelength $\lambda_{0,B}$, and two sideband components at the wavelengths $\lambda_{-1,B}$, $\lambda_{1,B}$ on both sides of the reference wavelength $\lambda_{0,B}$. The wavelength $\lambda_{1,B}$ may be selected to be the sideband wavelength.

The separation between the reference wavelengths $\lambda_{0,A}$ and $\lambda_{0,B}$ is $\neq \lambda_{AB}$. The separation between the sideband wavelength $\lambda_{1,A}$ and the reference wavelength $\lambda_{0,A}$ is $\Delta\lambda_A$. The separation $\Delta\lambda_A$ depends on the modulation frequency of the modulated data signal $B_{IN,A}$. The separation between the sideband wavelength $\lambda_{1,B}$ and the reference wavelength $\lambda_{0,B}$ is $\Delta\lambda_B$, respectively.

Figure 3:
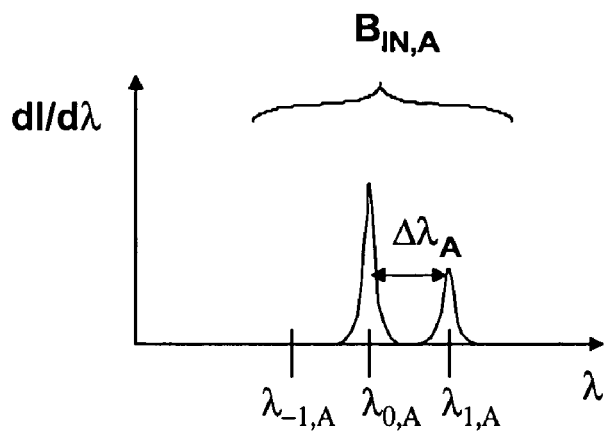
FIG. 3 shows, by way of example, the spectral composition of a modulated optical signal having a completely suppressed sideband.

Referring to FIG. 3, one or more of sideband components of the signal $B_{IN,A}$ may be suppressed such that the modulated data signal has sidebands on only one side of the carrier component at the reference wavelength $\lambda_{0,B}$. In FIG. 3, the sideband component is at the wavelength $\lambda_{1,A}$.

Figure 4:
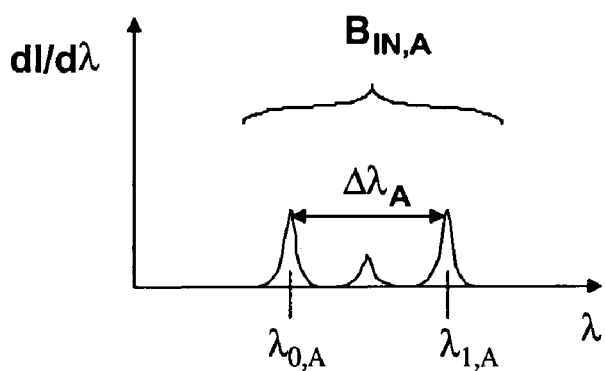
FIG. 4 shows, by way of example, the spectral composition of a modulated optical signal having a suppressed carrier component.

Referring to FIG. 4, the signal $B_{IN,A}$ may have at least two sideband components such that the carrier component is substantially suppressed. One of the sidebands components is now at the reference wavelength $\lambda_{0,A}$, and another is at the sideband wavelength $\lambda_{1,A}$. A signal modulated according to the carrier suppressed return to zero format (CSRZ) exhibits a spectral composition belonging to this category.

Figure 5:
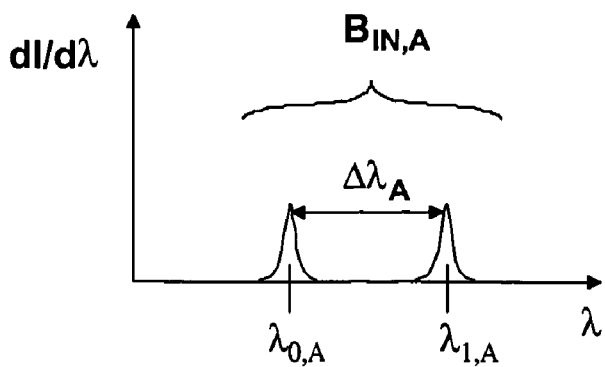
FIG. 5 shows, by way of example, a modulated optical signal having a completely suppressed carrier component.

Referring to FIG. 5, the spectral component at the carrier wavelength may be completely suppressed.

Figure 6:
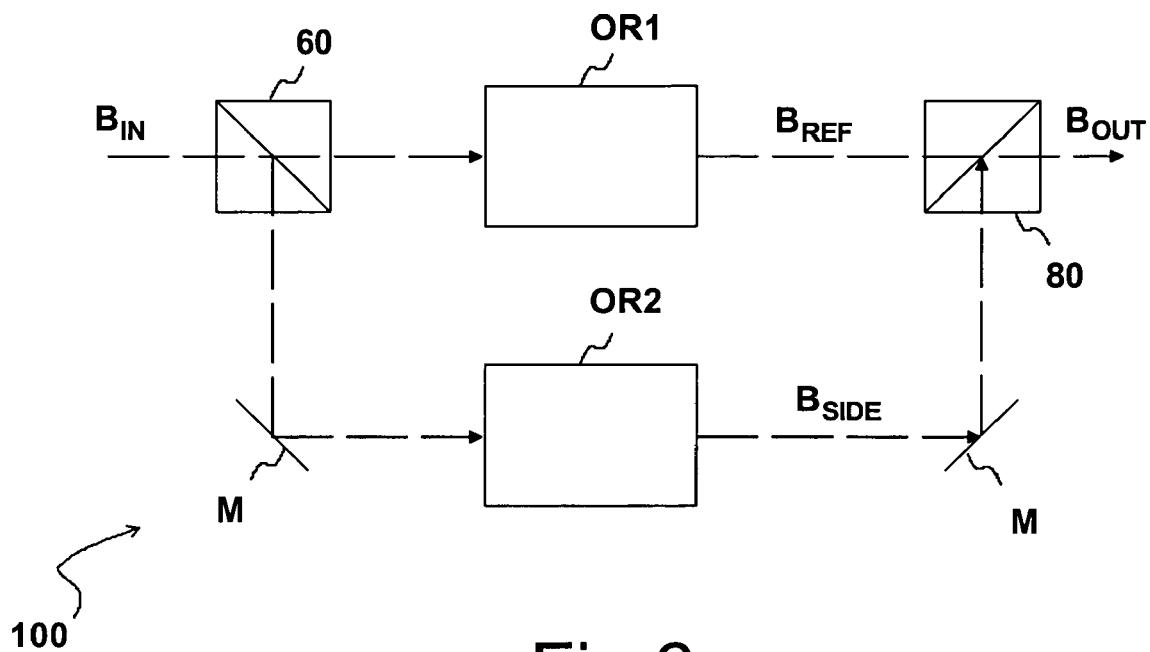
FIG. 6 shows a block diagram of an optical signal processing device according to the present invention.

FIG. 6 shows a block diagram of the signal processing device 100. An optical input signal $B_{IN}$ is split into at least two parts by splitter 60. The parts are subsequently filtered by at least two optical resonators OR1, OR2. Mirrors M may be used to guide light. The splitter 60 may be a polarizing splitter or a non-polarizing splitter.

An optical resonator is a device which has a capability to wavelength-selectively store optical energy carried at one or more wavelengths. Because the optical resonator has the capability to store optical energy, it may provide an optical output signal also during periods when no optical energy is coupled into the resonator. The optical resonator may be matched with a predetermined wavelength, which means that one pass band of the optical resonator substantially coincides with said predetermined wavelength such that the optical resonator stores optical energy carried at said wavelength. The term non-matched means that the pass bands of the optical resonator do not coincide with said predetermined wavelength.

In FIG. 6, the first optical resonator OR1 is matched with a reference wavelength of the optical input signal $B_{IN}$ and the second optical resonator OR2 is non-matched with the reference wavelength of the optical input signal $B_{IN}$. The first optical resonator OR1 provides a signal $B_{REF}$, which is herein called as the reference signal. The second optical resonator OR2 provides a signal $B_{SIDE}$, which is herein called as the sideband signal. The optical signals provided by the at least two resonators are combined by a combiner 80 to provide an output $B_{OUT}$.

The second optical resonator OR2 may be matched with the sideband wavelength. When the outputs of the first and the second optical resonators OR1, OR2 are combined by the combiner 80, the combined output exhibits $B_{OUT}$ a beat at a frequency which depends on the difference between the sideband wavelength and the reference wavelength.

Figure 7:
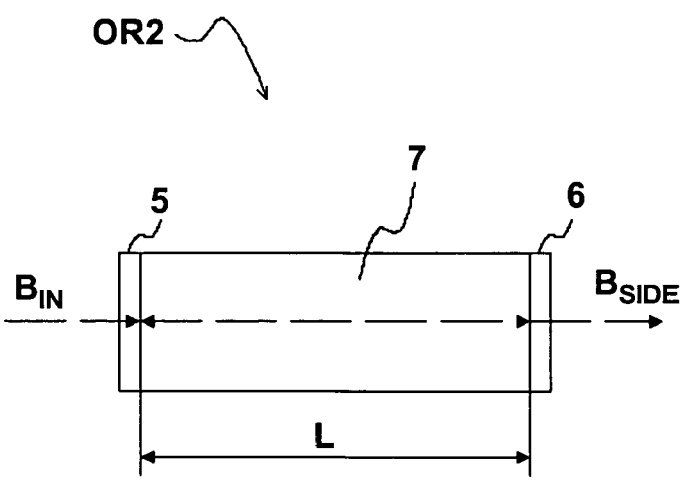
FIG. 7 shows schematically an optical resonator based on a cavity defined by reflectors.

Referring to FIG. 7, the optical resonators OR1, OR2 may be implemented using an optical cavity 7 defined between two reflectors 5, 6. The optical length of the cavity 7 is L. The optical length L is equal to the distance between the reflectors 5, 6 multiplied by the refractive index of the cavity medium. The resonators OR1, and OR2 act as band pass filters having a plurality of pass bands (see the second curve from the top in FIG. 4). The reflectors 5, 6 may be e.g. planar or spherical reflective surfaces. In case of planar reflective surfaces, adjacent pass bands in the vicinity of a wavelength $\lambda$ are separated by a separation range $\Delta\lambda_{SR}$ given by $$\Delta\lambda_{SR} = \frac{\lambda^2}{2L}. \quad (1)$$

Optical wavelength $\lambda$ in vacuum and optical frequency $\nu$ are coupled by the equation $\lambda=c/n\lambda$, where c is the speed of light in vacuum and n is the index of refraction. The separation range $\Delta\nu_{SR}$ may also be expressed in the frequency domain:

$$\Delta v_{SR} = \frac{c}{2L}. \quad (2)$$

The separation range $\Delta\lambda_{SR}$ may be substantially constant over a predetermined wavelength range. In order to implement a constant separation range, the cavity 7 may be non-dispersive. Alternatively, the resonators OR1 and/or OR2 may comprise further elements to compensate dispersion. On the other hand, the resonator OR1 and/or OR2 may also be dispersive to provide a varying separation range $\Delta\lambda_{SR}$. Such a resonator may be used e.g. in applications where the pass bands should coincide with several optical channels which have non-equal separations in the frequency domain.

Figure 8:
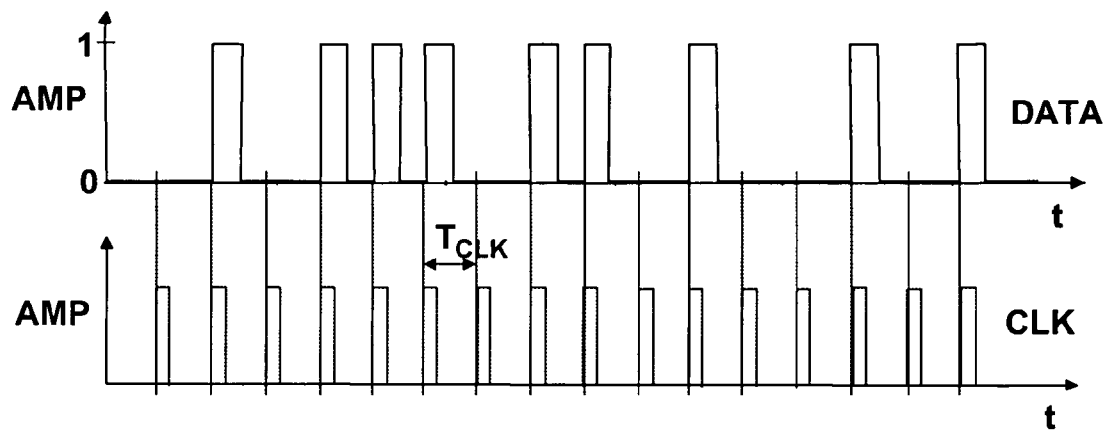
FIG. 8 shows by way of example a return-to-zero modulated data signal consisting of a sequence of rectangular pulses, and a clock signal associated with said data signal.

Referring to the upper curve of FIG. 8, a data signal DATA may consist of a sequence of rectangular pulses. The data signal DATA shown in FIG. 8 is modulated according to the return-to-zero (RZ) format. t denotes time and A denotes amplitude. At this stage the data signal DATA may be an optical signal or it may be an electrical signal. The timing of the data pulses is controlled the clock pulses CLK, which are shown by the lower curve of FIG. 8. The time period between two consecutive clock pulses is $T_{CLK}$. The frequency $v_{CLK}$ of the clock is equal to $1/T_{CLK}$, respectively.

Figure 9:
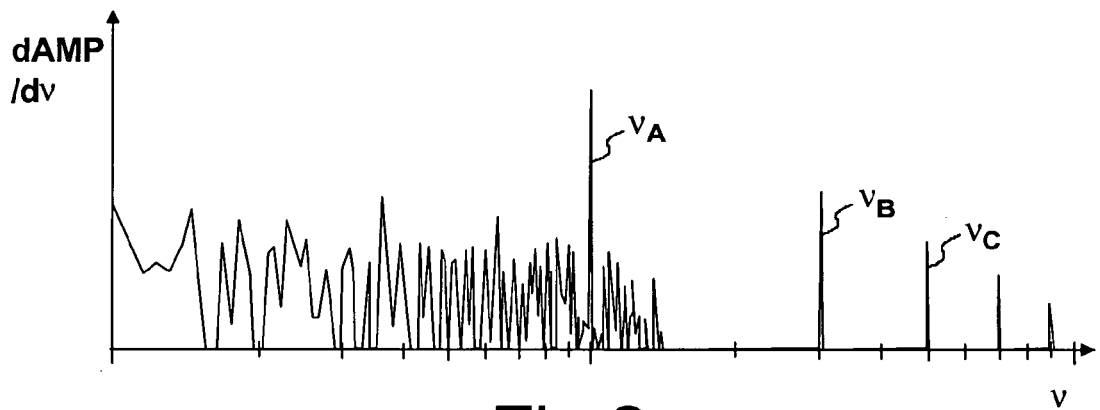
FIG. 9 shows the frequency decomposition of the data signal according to FIG. 8.

FIG. 9 shows the frequency decomposition of the data signal DATA according to FIG. 8. $v$ denotes frequency. The ordinate and the abscissa values are shown in logarithmic scale. The frequency decomposition exhibits several distinctive spectral peaks $v_A$, $v_B$, $v_C$, . . . In this case the spectral position of the peak $v_A$ is equal to the clock frequency $v_{CLK}$ associated with the data sequence according to FIG. 8.

Figure 10:
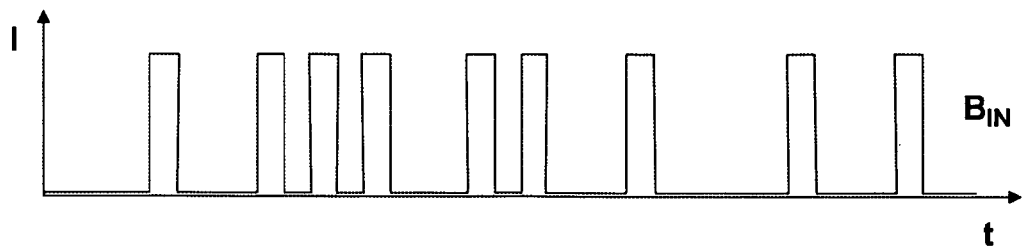
FIG. 10 shows an optical data signal modulated according to FIG. 8.

FIG. 10 shows schematically an optical input signal $B_{IN}$. The optical input signal $B_{IN}$ may be formed in the remote optical transmitter 200 (FIG. 1) by multiplying a continuous optical signal having wavelength $\lambda_0$ with the data signal DATA. The wavelength decomposition of the optical input signal $B_{IN}$ exhibits a central component at the wavelength $\lambda_0$ and also sideband components according to FIG. 9.

Figure 11:
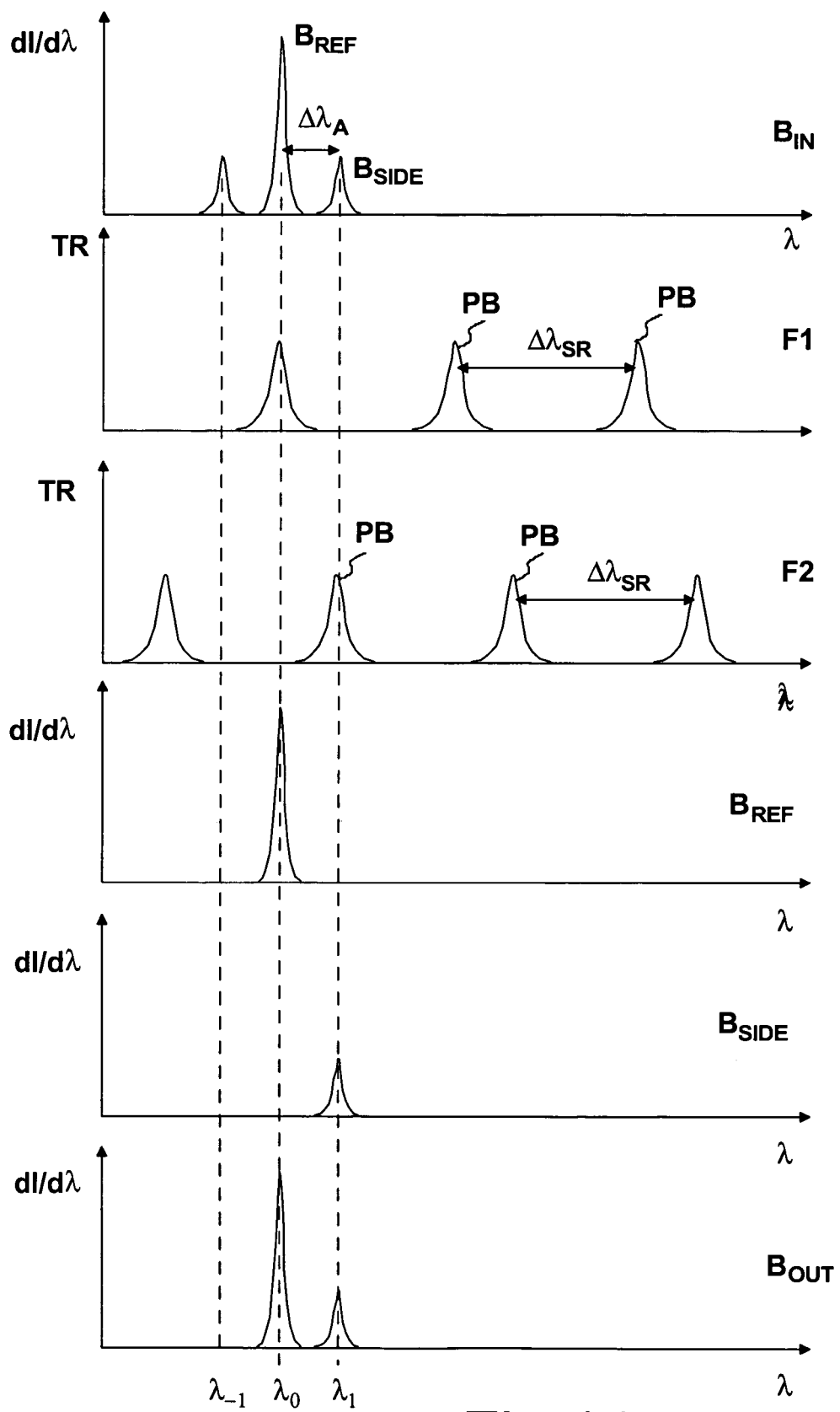
FIG. 11 shows schematically filtering and combination of optical signals in the wavelength domain.

The uppermost curve of FIG. 11 shows the spectral composition of the optical input signal $B_{IN}$ in the wavelength domain. In this example the optical input signal $B_{IN}$ consists of data transmitted at one optical channel only, i.e. is consists of only one data signal. The spectrum of the optical input signal $B_{IN}$ exhibits a component at least at the reference wavelength $\lambda_0$ and at the sideband wavelength $\lambda_1$. There may also be further spectral components, such as the component at the wavelength $\lambda_{-1}$. Also the wavelength $\lambda_{-1}$ could be selected as the sideband wavelength, instead of the wavelength $\lambda_1$.

A data signal may have several sideband components. However, based on the known format of modulation, the person skilled in the art is able to select a sideband spectral component and a reference spectral component such that their spectral separation $\Delta\lambda_A$ ($=\lambda_1-\lambda_0$) corresponds to the clock frequency of the data signal.

Referring to the second curve F1 from the top in FIG. 11, the spectral transmittance of the first optical resonator OR1 (FIG. 6) may have several adjacent pass bands PB. The separation of the pass bands PB is equal to the separation range $\Delta\lambda_{SR}$. One of the pass bands PB is tuned or set at least approximately to the reference wavelength $\lambda_0$. TR denotes the transmittance, i.e. the ratio of the transmitted intensity to the input intensity.

Referring to the third curve F2 from the top in FIG. 11, one of the pass band PB of the second resonator OR2 (FIG. 6) is tuned or set at least approximately to the sideband wavelength $\lambda_1$.

The pass bands PB may also be tuned simultaneously to the both sideband wavelengths $\lambda_{-1}$ and $\lambda_1$, provided that the integer multiple of the separation range $\Delta\lambda_{SR}$ of the second optical resonator OR2 (FIG. 6) is substantially equal to the separation between the sideband wavelengths $\lambda_{-1}$ and $\lambda_1$.

Referring to the fourth curve from the top in FIG. 11, the spectral component at the reference wavelength is transmitted by the first optical resonator OR1 (FIG. 6) to provide the reference signal $B_{REF}$.

Referring to the fifth curve from the top in FIG. 11, the sideband of the input signal $B_{IN}$ is transmitted by the second optical resonator OR2 (FIG. 6) to provide the sideband signal $B_{SIDE}$.

Referring to the lowermost curve in FIG. 11, the combined output of the optical resonators OR1, OR2 (FIG. 6) comprises the reference signal $B_{REF}$ and the sideband signal $B_{SIDE}$.

The reference wavelength $\lambda_0$ corresponds to a reference frequency $v_0$ which is equal to $c/n\lambda_0$. The sideband wavelength $\lambda_1$ corresponds to a sideband frequency $v_1$ which is equal to $c/n\lambda_1$. The intensity of the output signal $B_{OUT}$ exhibits now periodic variations, i.e. beat in a frequency which is equal to the difference between the sideband frequency $v_1$ and the reference frequency $v_0$. Thus, the output signal $B_{OUT}$ may be used as an optical clock signal.

The electric field $E_{OUT}$ of the optical output signal $B_{OUT}$ is a superposition $$E_{OUT}(t)=E_1 \exp(j2\pi v_1 t)+E_0 \exp(j2\pi v_0 t), \quad (3)$$

where $E_1$ is the amplitude of the field of the sideband signal $B_{SIDE}$ after the combiner 80 (FIG. 6) and $E_0$ is the amplitude of the electric field of the reference signal $B_{REF}$ after the combiner 80. The intensity $I_{OUT}$ of the output signal $B_{OUT}$ is given by $$I_{OUT}(t) \propto E_{OUT}(t) E_{OUT}^*(t) \quad (4)$$

$$I_{OUT}(t) \propto E_1^2 + E_0^2 + 2E_1 E_0 \cos[2\pi(v_1-v_0)t]. \quad (5)$$

$$I_{OUT}(t) \propto E_1^2 + E_0^2 + 2E_1 E_0 \cos(2\pi v_{CLK} t) \quad (6)$$

The output intensity exhibits a substantially sinusoidal beat at the frequency $v_1-v_0$, i.e. at the frequency $v_{CLK}$ of the clock. The last term in the equations (5) and (6) is herein called as the beating term.

The output signal $B_{OUT}$ is a vector sum of the sideband signal $B_{SIDE}$ and the reference signal $B_{REF}$. When the sideband signal $B_{SIDE}$ and the reference signal $B_{REF}$ are combined by the combiner 80, the polarization (i.e. the orientation of polarization) of the sideband signal $B_{SIDE}$ may be at any angle with respect to the polarization of the reference signal $B_{REF}$. Parallel polarization provides maximum beating amplitude.

The orientation of the polarization of the reference signal $B_{REF}$ and/or the sideband signal $B_{SIDE}$ may be adjusted or set such that the polarization of the reference signal $B_{REF}$ is parallel to the polarization of the sideband signal $B_{SIDE}$.

The relative contribution of the beating term may be maximized by setting the intensity of the reference signal $B_{REF}$ to be approximately equal to the average intensity of the sideband signal $B_{SIDE}$, i.e. by setting $E_1 \approx E_0$.

The relative intensities of the reference signal $B_{REF}$ and the sideband signal $B_{SIDE}$ may be controlled e.g. by adjusting the angular orientation of a polarizer positioned in the optical path and/or by using an optical attenuator in combination with the first optical resonator OR1. The polarizer may be positioned before or after the optical resonator. One or more optical amplifiers may be used in combination with the resonators. The intensity of the reference signal $B_{REF}$ and/or the sideband signal $B_{SIDE}$ may be controlled by adjusting the amplification.

The optical resonator has a capability to store optical energy. This phenomenon is now discussed with reference to the resonator according to FIG. 7. However, the discussion is relevant also regarding other types of optical resonators. Photons coupled into the resonator according to FIG. 7 pass, in average, several times back and forth between the reflectors 5, 6 before escaping from the cavity 7. Thus, the resonator OR1 can sustain its state for some time regardless of perturbations of the optical input signal $B_{IN}$. The time constant $\tau$ of the optical resonator according to FIG. 7 is given by the equation $$\tau = \frac{L}{-c\ln(r)}, \qquad (7)$$

where L is the optical length of the cavity 7 (physical distance multiplied by the refractive index) between the reflectors 5, 6, c is the speed of light in vacuum and r is the reflectance of the reflectors 5, 6. For example, by selecting the parameters r=0, 99 and L=1 mm, the time constant $\tau$ of the resonator is 332 picoseconds.

The time constant $\tau$ may be selected to be greater than or equal to the average time period during which the optical input signal $B_{IN}$ does not change its state.

The time constant $\tau$ may be selected to be greater than or equal to the average time period during which the optical input signal $B_{IN}$ remains at zero.

Figure 12:
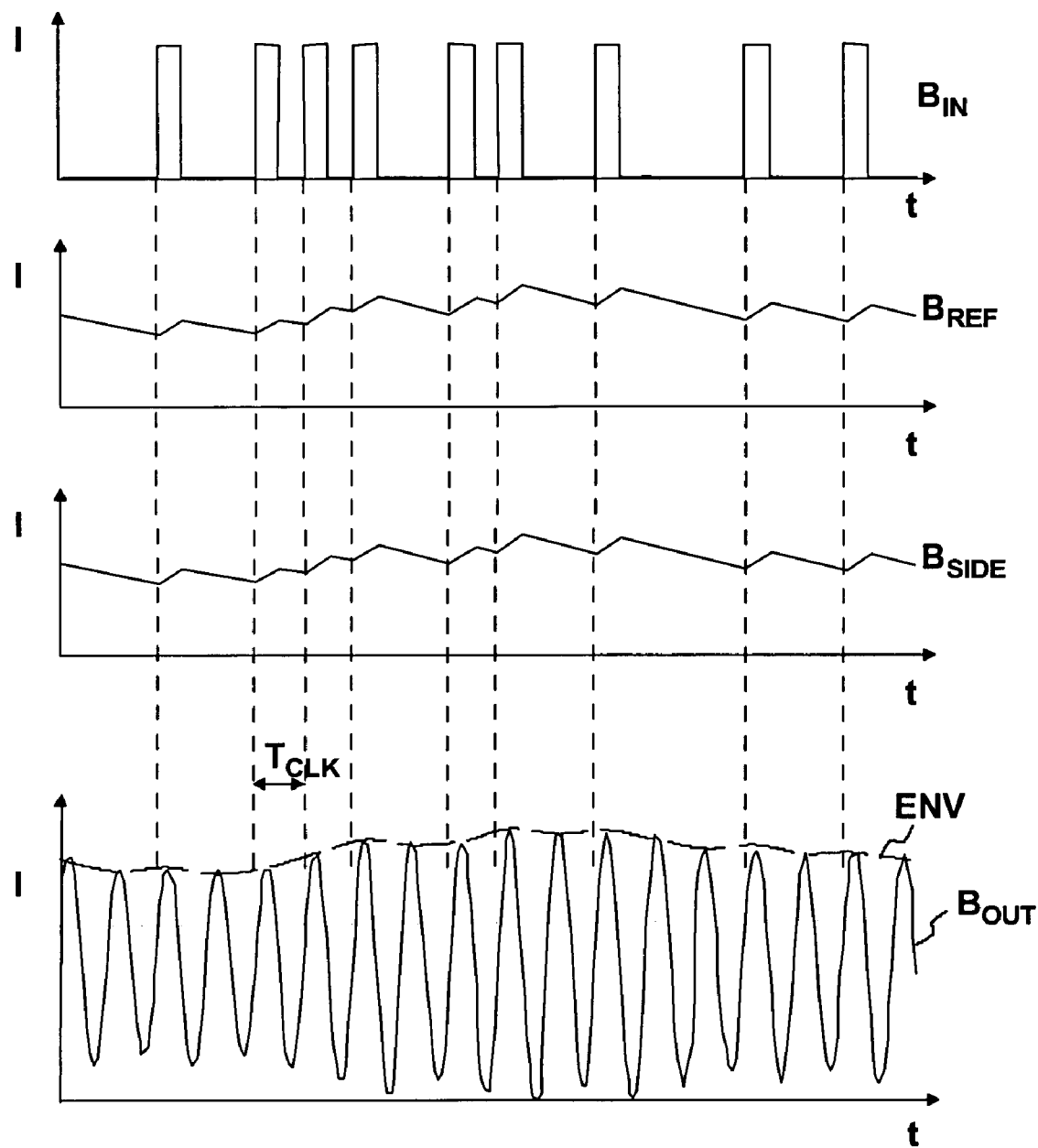
FIG. 12 shows by way of example a return-to-zero modulated optical input signal, the temporal evolution of a sideband signal and the temporal evolution of an output signal corresponding to said input signal.

FIG. 12 shows the temporal behavior of the sideband signal $S_{SIDE}$ and the output signal $B_{OUT}$ corresponding to a return-to-zero-modulated (RZ) input signal $B_{IN}$. The uppermost curve shows the input signal $B_{IN}$. The second curve from the top shows the temporal behavior of the reference signal $B_{REF}$. The intensity of the reference signal $B_{REF}$ decreases when no optical energy is delivered to the first optical resonator OR1, i.e. the second optical resonator OR1 is discharged. The intensity of the sideband signal $B_{REF}$ increases when optical energy is delivered to the first optical resonator OR1, i.e. the second optical resonator OR1 is charged. Referring to the third curve from the top in FIG. 12, the sideband signal $B_{SIDE}$ exhibits similar type of fluctuations as the sideband signal $B_{REF}$.

The lowermost curve shows the temporal behavior of the output signal $B_{OUT}$. The output signal $B_{OUT}$ exhibits a beat at a frequency corresponds to the difference between the reference wavelength and the sideband wavelength. It this case the reference wavelength and the sideband wavelength are selected such that the output signal $B_{OUT}$ exhibits a beat at the clock frequency $v_{CLK}$. The envelope ENV of the output signal $B_{OUT}$ fluctuates according to the fluctuating signals $B_{SIDE}$, $B_{REF}$. It is emphasized that although the envelope ENV of the output signal intensity fluctuates, the amplitude of the beating of the output signal $B_{OUT}$ approaches zero only if the input signal $B_{IN}$ is at zero for a long time. Thus, the beating output signal $B_{OUT}$ can be used as an uninterrupted clock signal.

Figure 20:
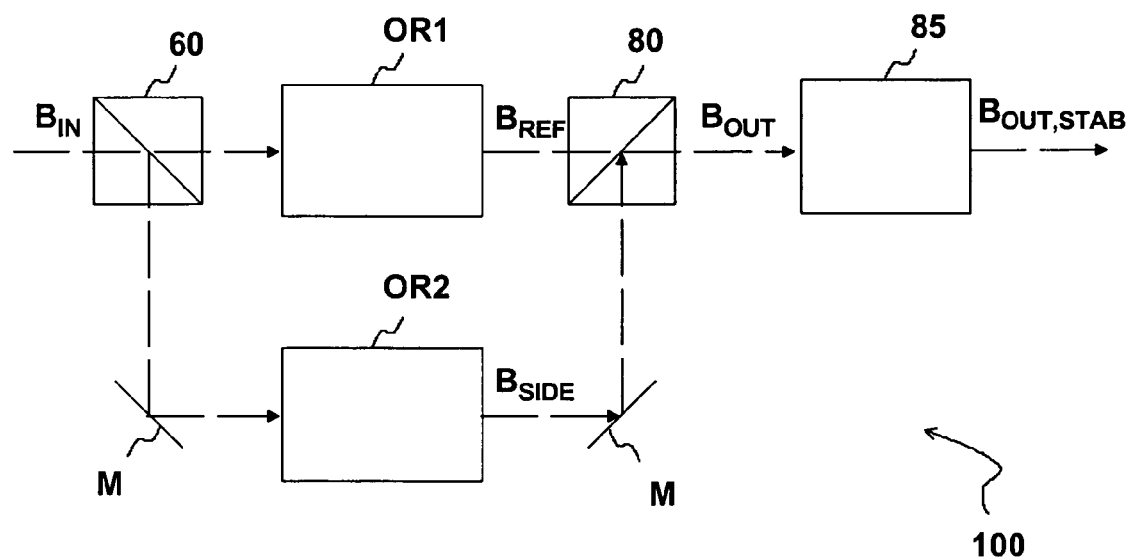
FIG. 20 shows a block diagram of an embodiment of the optical signal processing device, said device comprising an output stabilization unit.
Figure 21:
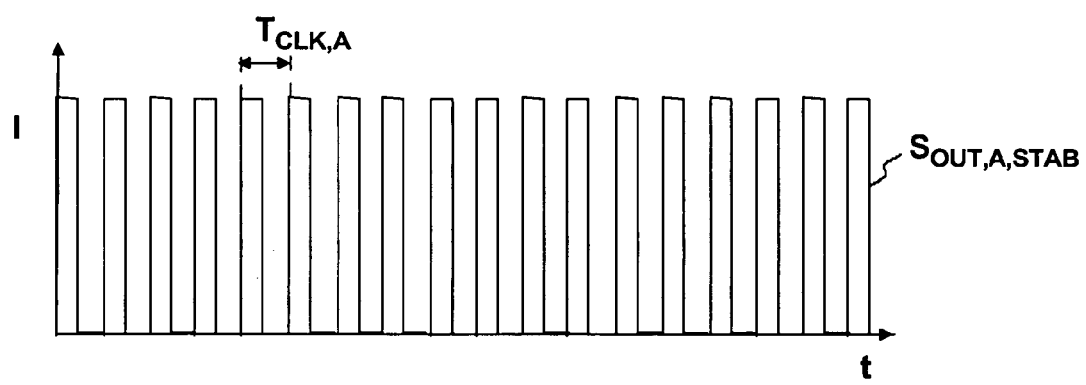
FIG. 21 shows, by way of example, an output signal which is stabilized with respect to the beat amplitude.

The signal processing device 100 may further comprise an output stabilization unit to provide an output signal which is stabilized with respect to the beat amplitude, and reshaped (See FIGS. 20 and 21 and the related discussion).

The first optical resonator OR1 and/or the second optical resonator OR2 may be implemented using optical resonators known by the person skilled in the art. Suitable optical resonators are disclosed e.g. in an article "Optical Tank Circuits Used for All-Optical Timing Recovery" by M. Jinno, T. Matsumoto, IEEE Journal of Quantum Electronics, Vol. 28, No. 4 Apr. 1992 pp. 895-900.

Referring to the resonator shown in FIG. 7, the wavelength position of the pass bands PB of the first optical resonator OR1 and/or the second optical resonator OR2 may be set by adjusting the distance between the reflectors 5, 6. The setting may be also performed by other methods known by the person skilled in the art. The methods comprise e.g. controlling temperature, pressure, electric field, voltage, current, deformation of the cavity or displacement of the reflectors 5, 6.

An optical resonator may have active feedback means to tune the wavelength position of the pass bands PB. An optical resonator may be manufactured to provide the desired positions of the passbands PB. An optical resonator may be selected from among several resonators to provide the desired positions of the passbands PB. An optical resonator may have a replaceable component to implement the desired positions of the passbands PB.

Figure 13:
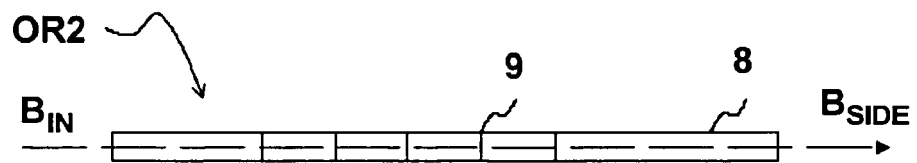
FIG. 13 shows schematically an optical resonator based on a fiber optic grating.

Referring to FIG. 13, the first optical resonator OR1 and/or the second optical resonator OR2 may be implemented using a fiber optic grating. The grating comprises a portion of optical waveguide 8 comprising a plurality of periodic features 9.

Figure 14:
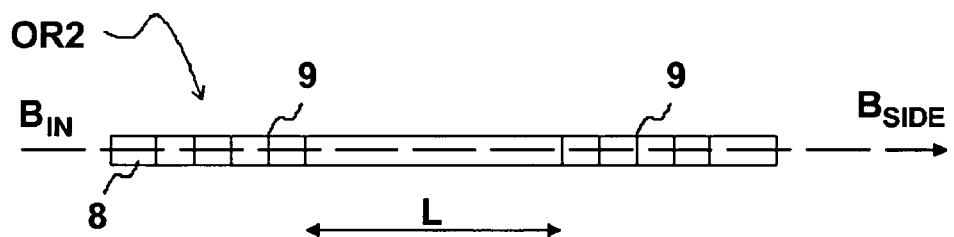
FIG. 14 shows schematically an optical resonator based on two gratings.

Referring to FIG. 14, the first optical resonator OR1 and/or the second optical resonator OR2 may be implemented using two or more gratings, said gratings defining a cavity between them. The gratings may be Bragg gratings.

Figure 15:
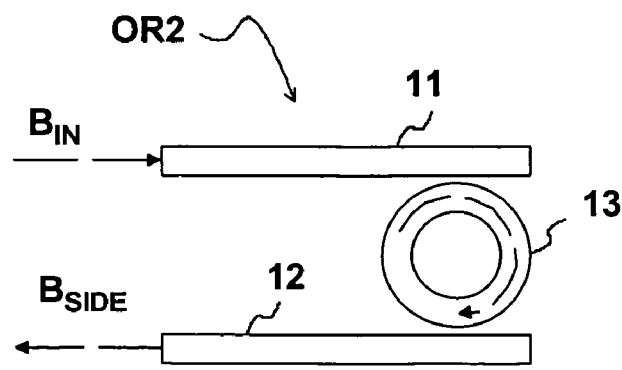
FIG. 15 shows schematically an optical resonator based on a micro ring.

Referring to FIG. 15, the first optical resonator OR1 and/or the second optical resonator OR2 may be implemented using a micro ring resonator. Waveguides 11, 12 may be arranged to couple light in and out from a micro ring 13, said micro ring 13 forming an optical resonator. Light may be coupled to and from the waveguides and other optical components, such as the ring resonators 13, by evanescent coupling.

Figure 16:
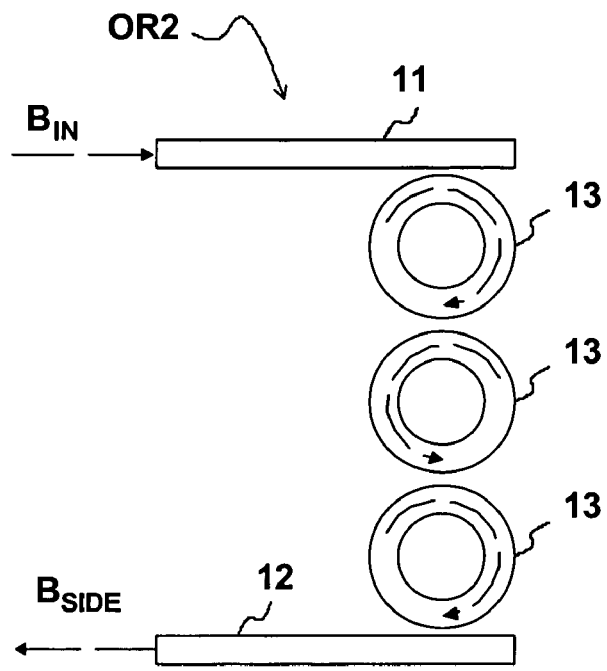
FIG. 16 shows schematically an optical resonator based on a plurality of optically coupled micro rings.

Referring to FIG. 16, the first optical resonator OR1 and/or the second optical resonator OR2 may be implemented using a plurality of optically coupled optical resonators, e.g. micro ring resonators.

The first optical resonator OR1 and/or the second resonator OR2 may also be implemented using a resonator formed based on a fiber loop or a portion of a fiber defined between two reflectors (not shown).

The first optical resonator OR1 and/or the second resonator OR2 may be based on a grating based device, a monochromator, an arrayed waveguide grating, a periodic microstructure, a stack of thin films, or a combination thereof.

The first optical resonator OR1 and/or the second resonator OR2 may comprise a cavity 7, which comprises gas, such air. The cavity 7 may comprise transparent solid or liquid. The cavity 7 may be a vacuum cavity. The resonators OR1, OR2 may e.g. comprise a pair of dielectric-coated mirrors separated by a gas air, such as air, or vacuum. The first optical resonator OR1 and/or the second resonator OR2 may be implemented using free-space optical components, integrated optics and/or fiber optical components. The first optical resonator OR1 and/or the second optical resonator OR2 may be used in the transmissive mode or in the reflective mode.

The first resonator OR1 and the second resonator OR2 may be implemented using a birefringent structure, e.g. a cavity 7 comprising birefringent medium. Thus, two different optical lengths may be implemented simultaneously using a single physical unit. The input signal $B_{IN}$ may be divided into two parts having e.g. vertical and horizontal polarizations inside the birefringent resonator. The optical length of the cavity 7 corresponding to the vertical polarization may be adjusted to provide a pass band at the reference wavelength $\lambda_0$. The optical length of the cavity 7 corresponding to the horizontal polarization may be adjusted to provide a pass band at the sideband wavelength $\lambda_1$.

The birefringent medium may comprise liquid crystals. Thus, the optical properties of the medium may be controlled by applying an electric field over the medium.

The combiner 80 may be a semitransparent reflector, a beam splitter or a beam coupler based on fiber optics, an integrated optical Y-coupler, a directional coupler, a filter, a grating-based coupler, a polarizer PBS2 or a spatial multiplexer. The combiner 80 may also be a combination of these and/or related optical elements. The combiner may combine the signals at a ratio 50% to 50%.

Figure 17:
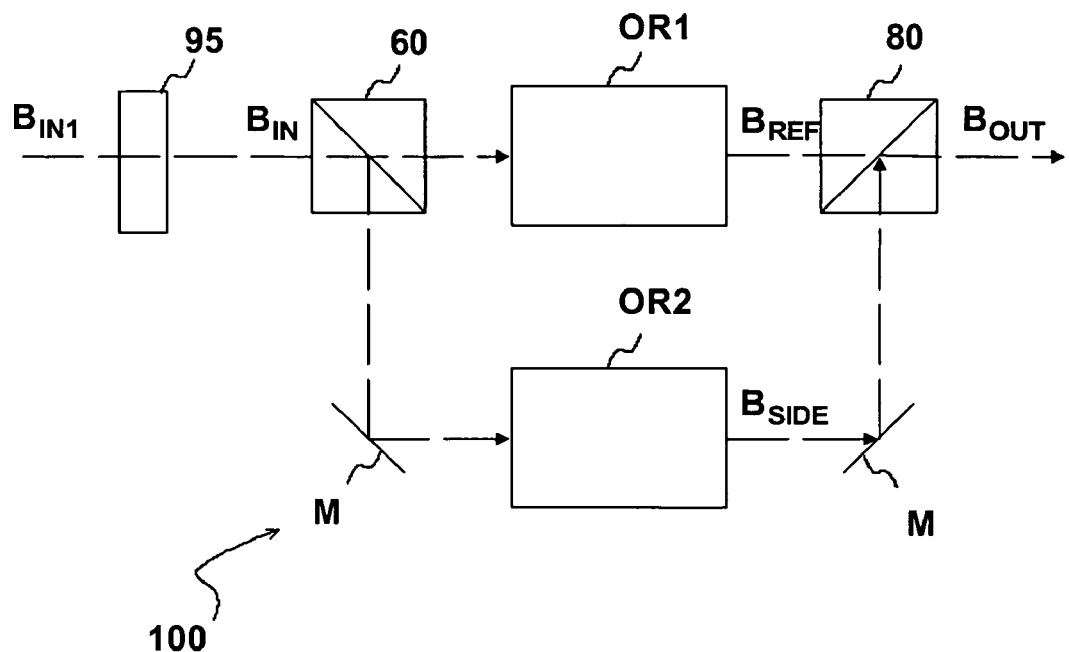
FIG. 17 shows a block diagram of an embodiment of the optical signal processing device, said device comprising a polarization controller to control the polarization of the optical input signal.

Referring to FIG. 17, the signal processing device 100 may comprise a polarization controlling element 95. The polarization controlling element 95 may be adapted to select a portion of an optical primary input signal $B_{IN1}$ having a predetermined polarization, i.e. orientation of polarization. The polarization controlling element 95 is advantageously used when the optical primary signal $B_{IN1}$ is unstable or unknown. The polarization controlling element 95 may also be adapted to change the polarization of the primary signal $B_{IN1}$.

One or more polarization controlling elements 95 may be positioned before the first optical resonator OR1, between the first optical resonator OR1 and the combiner 80, or after the combiner 80.

One or more polarization controlling elements 95 may be positioned before the second optical resonator OR2, between the second optical resonator OR2 and the combiner 80, or after the combiner 80.

The splitter 60 may be a polarization controlling element 95. The combiner 80 may be a polarizing combiner PBS2.

The polarization controlling element 95 may be any type of polarizer or polarization controller known by the person skilled in the art. The polarization controlling element 95 may be a fiber-based polarization controller, a set of waveplates, a polarizing crystal, or a polarizing foil. The polarization controlling element 95 may comprise a combination of optical components.

Figure 18:
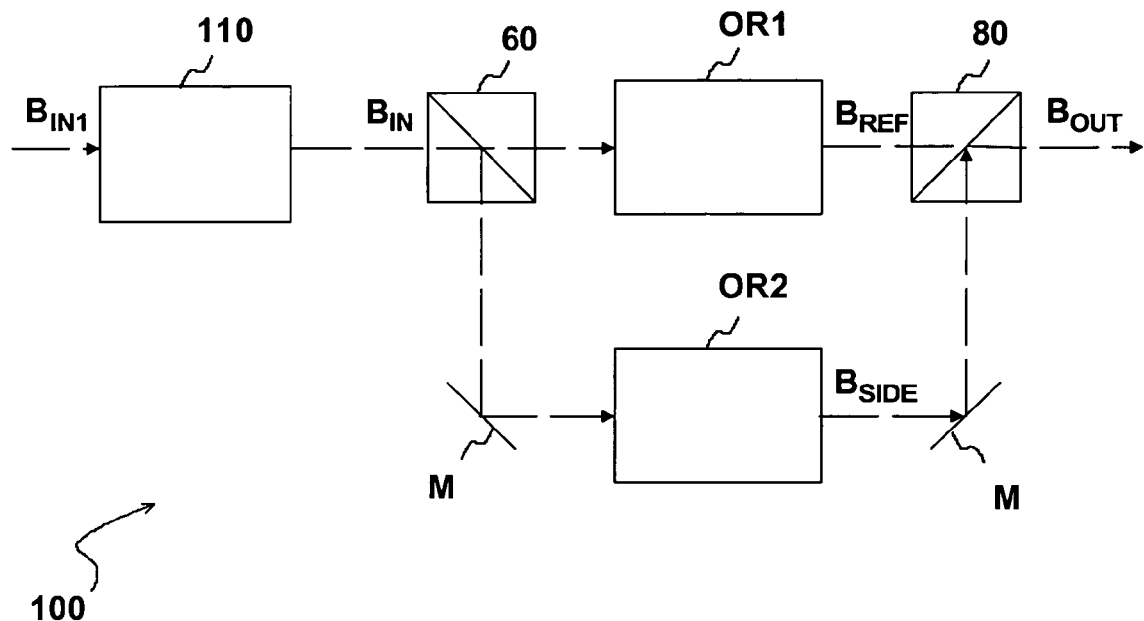
FIG. 18 shows a block diagram of an embodiment of the optical signal processing device, said device comprising pre-processing unit to generate further spectral components based on a primary signal.

Referring to FIG. 18, the signal processing device 100 may comprise a pre-processing unit 110.

Pre-processing of an optical primary input signal $B_{IN1}$ may comprise modifying the polarization, intensity, phase, and/or change of the reference wavelength. The pre-processing may be performed individually in a wavelength-dependent way for each optical data channel.

A primary optical input signal $B_{IN1}$ may be modulated in such a way that it does not originally comprise spectral components corresponding to the clock. Pre-processing of an optical primary input signal $B_{IN1}$ may comprise providing an optical input signal $B_{IN}$ which comprises spectral components associated with the clock frequency of the primary optical input signal $B_{IN1}$. The primary optical input signal $B_{IN1}$ may be modulated e.g. according to the non-return-to-zero (NRZ) format.

Figure 19:
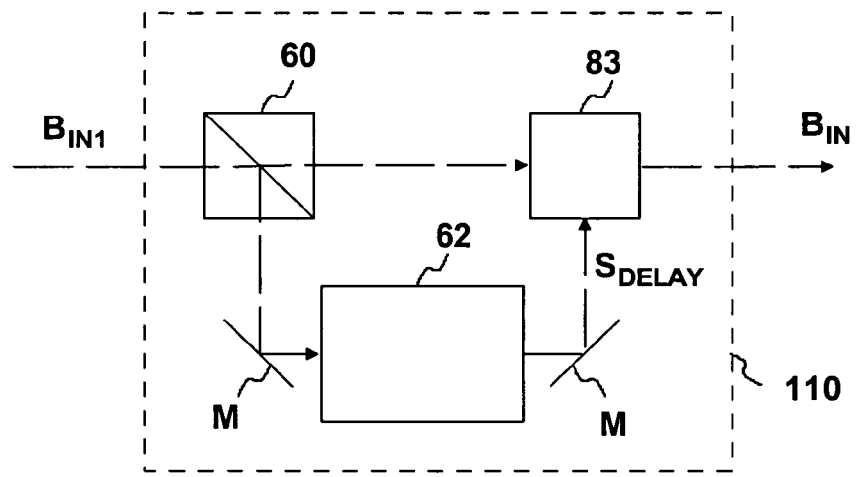
FIG. 19 shows a block diagram of the pre-processing unit.

Referring to FIG. 19, the pre-processing unit 110 may comprise a delay line to provide a delay signal by delaying said primary optical input signal, and an optical combiner to provide an exclusive-OR function of said delay signal and said primary optical input signal. Consequently, an optical input signal $B_{IN}$ may be provided which comprises frequency components associated with the clock frequency. Such an arrangement is disclosed e.g. in an article "All-Optical Clock Recovery from NRZ Data of 10 Gb/s", by H. K. Lee, J. T. Ahn, M.-Y. Jeon, K. H. Kim, D. S. Lim, C.-H. Lee, IEEE Photonics Technology Letters, Vol. 11 No.6 June 1999 pp. 730-732. The pre-processing unit 110 may also be implemented by non-linear devices such as disclosed e.g. in U.S. Pat. No. 5,339,185.

Referring to FIGS. 20 and 21, the signal processing device 100 may further comprise an output stabilization unit 85 to provide an output signal $B_{OUT,STAB}$ which is stabilized and/or reshaped with respect with respect to the beat amplitude. The stabilization unit 85 may be based on an optical resonator exhibiting optical bistability. The stabilization unit 85 may be based on an optically saturable element. The stabilization unit 85 may be based on the use of one or more semiconductor optical amplifiers.

Figure 22:
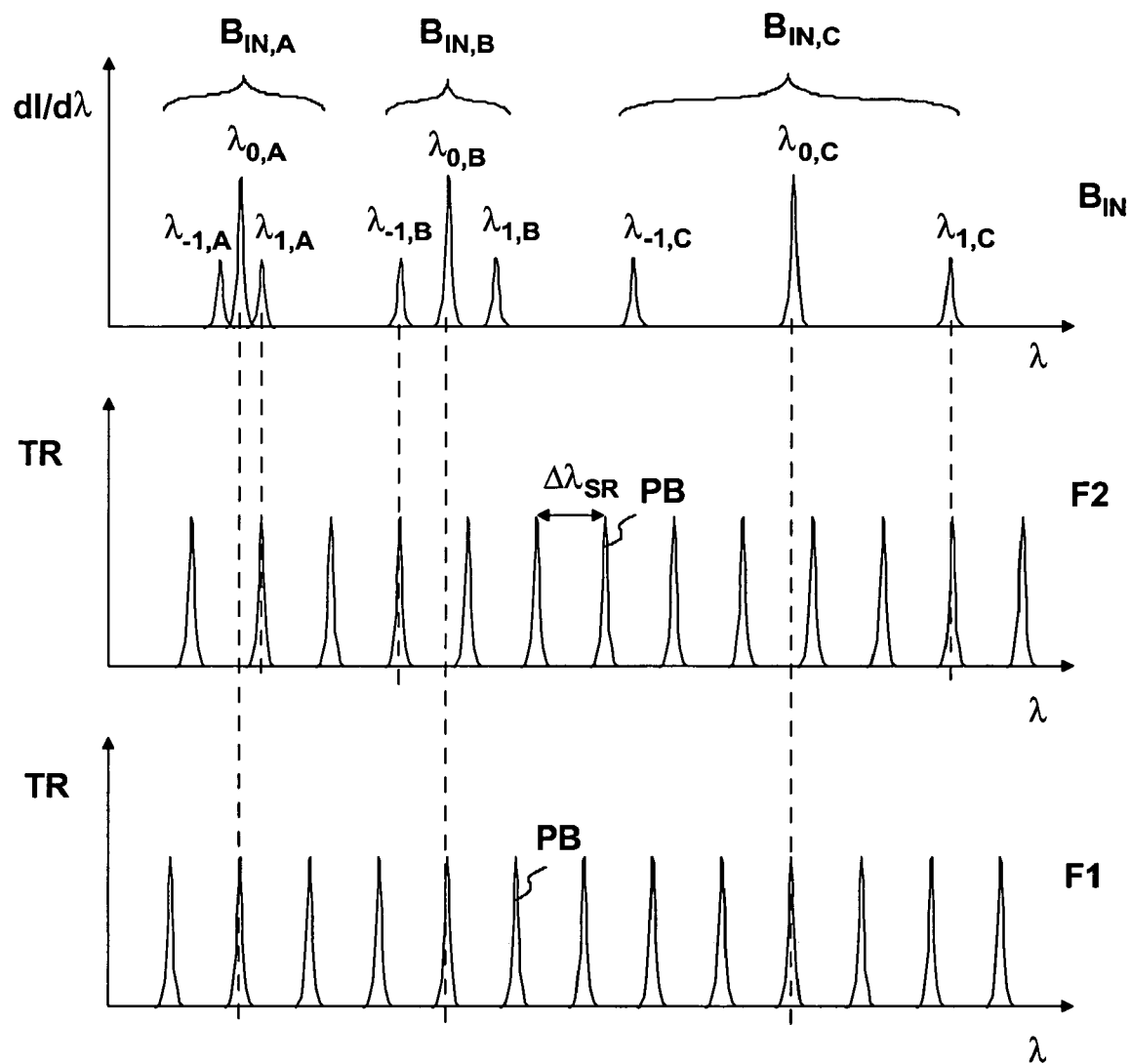
FIG. 22 shows schematically processing of an optical signal consisting of three modulated data signals.

Referring to the uppermost curve in FIG. 22, the signal processing device 100 may be used to simultaneously recover clock frequencies of several modulated data signals $B_{IN,A}$, $B_{IN,B}$, $B_{IN,C}$. There are three reference wavelengths $\lambda_{0,A}$, $\lambda_{0,B}$ and $\lambda_{0,C}$. The wavelengths $\lambda_{1,A}$, $\lambda_{1,B}$, and $\lambda_{1,C}$ are selected as the sideband wavelengths. The spectral components at the wavelengths $\lambda_{-1,A}$, $\lambda_{-1,B}$ and $\lambda_{-1,C}$ are not used. The sideband wavelengths $\lambda_{1,A}$, $\lambda_{1,B}$, and $\lambda_{1,C}$ correspond to three different clock frequencies.

The second curve F2 of FIG. 22 shows the pass bands PB of the second resonator OR2. One of the pass bands is set at least approximately to the sideband wavelength $\lambda_{1,A}$, one of the pass bands is set at least approximately to the sideband wavelength $\lambda_{-1,B}$ and one of the pass bands is set at least approximately to the sideband wavelength $\lambda_{1,C}$.

Referring to the lowermost curve F1 of FIG. 14, the passbands PB of the first optical resonator OR1 are adapted to match with the three reference wavelengths $\lambda_{0,A}$, $\lambda_{0,B}$ and $\lambda_{0,C}$.

Combination of the transmitted sideband signal $B_{SIDE}$ and transmitted reference signal $B_{REF}$ provides an output signal $B_{OUT}$ which is a superposition of the spectral components at the wavelengths $\lambda_{0,A}$, $\lambda_{0,B}$, $\lambda_{0,C}$, $\lambda_{0,A}$, $\lambda_{0,B}$ and $\lambda_{0,C}$.

Figure 23:
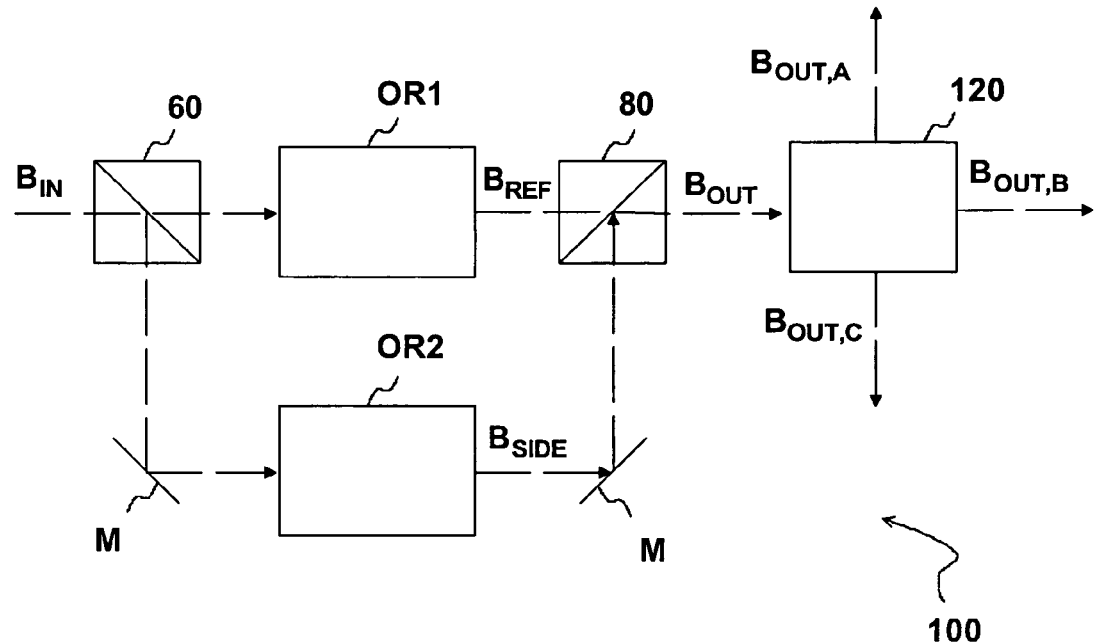
FIG. 23 shows a block diagram of an embodiment of the optical signal processing device comprising a wavelength demultiplexer.

Referring to FIG. 23, the signal processing device 100 may comprise a spectral demultiplexer 120 to separate the spectral components associated with the different data signals. The demultiplexer may be based on a grating device, an arrayed waveguide grating, or further optical resonators. The output $B_{OUT,A}$ of the demultiplexer exhibits beat at the clock frequency of the first data signal $B_{IN,A}$, the output $B_{OUT,B}$ of the demultiplexer exhibits beat at the clock frequency of the first data signal $B_{IN,B}$, and the output $B_{OUT,C}$ of the demultiplexer exhibits beat at the clock frequency of the first data signal $B_{IN,C}$.

The pass bands PB of the second optical resonator OR2 may be simultaneously adapted to correspond to a set of frequencies $v_q$ given by:

$$v_q = v_{0,A} + q\Delta v_{SR} + v_{CLK,A}, \quad (8)$$

where q is an integer ( . . . −2, −1, 0, 1, 2, 3, . . . ), $v_{0,A}$ is the optical frequency (=c/n$\lambda_0$) corresponding to the reference wavelength $\lambda_0$ of a predetermined optical channel A, $\Delta v_{SR}$ is the separation between the pass bands of the second resonator OR2 in the frequency domain and $v_{CLK,A}$ is the clock frequency.

Instead of the equation (8), the pass bands PB of the second optical resonator OR2 may be also be simultaneously adapted to correspond to a set of frequencies $v_q$ given by:

$$v_q = v_{0,A} + q\Delta v_{SR} - v_{CLK,A}, \quad (9)$$

For example, the separation between the reference wavelengths may be 100 GHz, the separation range $\Delta v_{SR}$ may be 50 GHz and the lowest clock frequency $v_{CLK,A}$ may be 10 GHz. In that case, according to the equation (8), the second optical resonator OR2 may be adapted to simultaneously filter frequencies $v_{0,A}$−140 GHz $v_{0,A}$−90 GHz, $v_{0,A}$−40 GHz, $v_{0,A}$+10 GHz, $v_{0,A}$+60 GHz, $v_{0,A}$+110 GHz, $v_{0,A}$+160 GHz, $v_{0,A}$+210 GHz . . . Consequently, several clock frequencies associated with different optical channels, i.e. associated with several reference wavelengths may be recovered simultaneously, providing that the sideband wavelengths coincide with the pass bands of the second optical resonator OR2. An example of a possible combination of reference frequencies and clock frequencies is presented in Table 1.

TABLE 1

A example of a possible combination of reference frequencies, clock frequencies and pass band positions.

| Data Signal No. | Reference frequency | Clock frequency | Positions of 2nd resonator passbands | Positions of 1st resonator passbands |
|---|---|---|---|---|
| 1 | $v_{0,A}$ − 200 GHz | 10 GHz | $v_{0,A}$ − 190 GHz | $v_{0,A}$ − 200 GHz |
| 2 | $v_{0,A}$ | 40 GHz | $v_{0,A}$ − 40 GHz | $v_{0,A}$ |
| 3 | $v_{0,A}$ + 200 GHz | 10 GHz | $v_{0,A}$ + 210 GHz | $v_{0,A}$ + 200 GHz |
| 4 | $v_{0,A}$ + 1000 GHz | 160 GHz | $v_{0,A}$ + 1160 GHz | $v_{0,A}$ + 1000 GHz |

In multi-channel processing, the separation range $\Delta\lambda_{SR}$ of the first optical resonator OR1 may be selected to be equal to an integer multiple of the separation range of the second optical resonator OR2.

The separation between adjacent reference wavelengths $\lambda_{0,A}$, $\lambda_{0,B}$ may be selected to be substantially equal to the separation range $\Delta\lambda_{SR}$ of the first resonator OR1 multiplied by an integer number.

The separation between adjacent reference wavelengths $\lambda_{0,A}$, $\lambda_{0,B}$ may be selected to be substantially equal to the separation range $\Delta\lambda_{SR}$ of the second resonator OR2 multiplied by an integer number.

It is emphasized that the separation between adjacent reference wavelengths $\lambda_{0,A}$, $\lambda_{0,B}$ does not need not to correspond an integer multiple of the clock frequency. Thus, the method according to the present invention allows considerable freedom to select the spectral positions of the modulated data signals and/or the clock frequencies.

Figure 24:
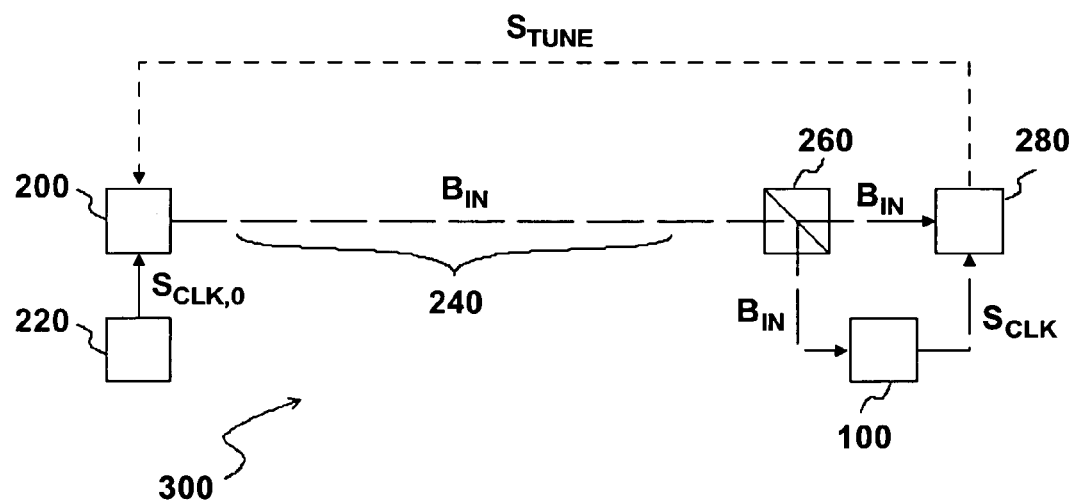
FIG. 24 shows a block diagram of a communication system comprising means to transmit control information to an optical transmitter.

Referring to FIG. 24, an optical communication system may comprise:

means to provide control information related to the spectral position of at least one spectral component of the optical input signal $B_{IN}$ with respect to the position of at least one pass band PB of the optical resonator OR1 or OR2, means to send the control information to the optical transmitter 200, and means to adjust the spectral position of said at least one spectral component based on said control information, preferably to match with said at least one pass band PB.

In general, the signal processing device 100 is understood to comprise optical paths between the optical components, said paths being implemented by free-space optical links, liquid or solid-state optical waveguides, and/or optical fibers. The optical paths and the optical components of the signal processing device 100 may be implemented using free-space optical components, integrated optics and/or fiber optical components. The signal processing device 100 may be implemented with methods of integrated optics on a solid-state substrate using miniaturized components. The spectral demultiplexer 120, the optical resonators 100, and further optical components may be integrated on the same substrate.

Figure 25:
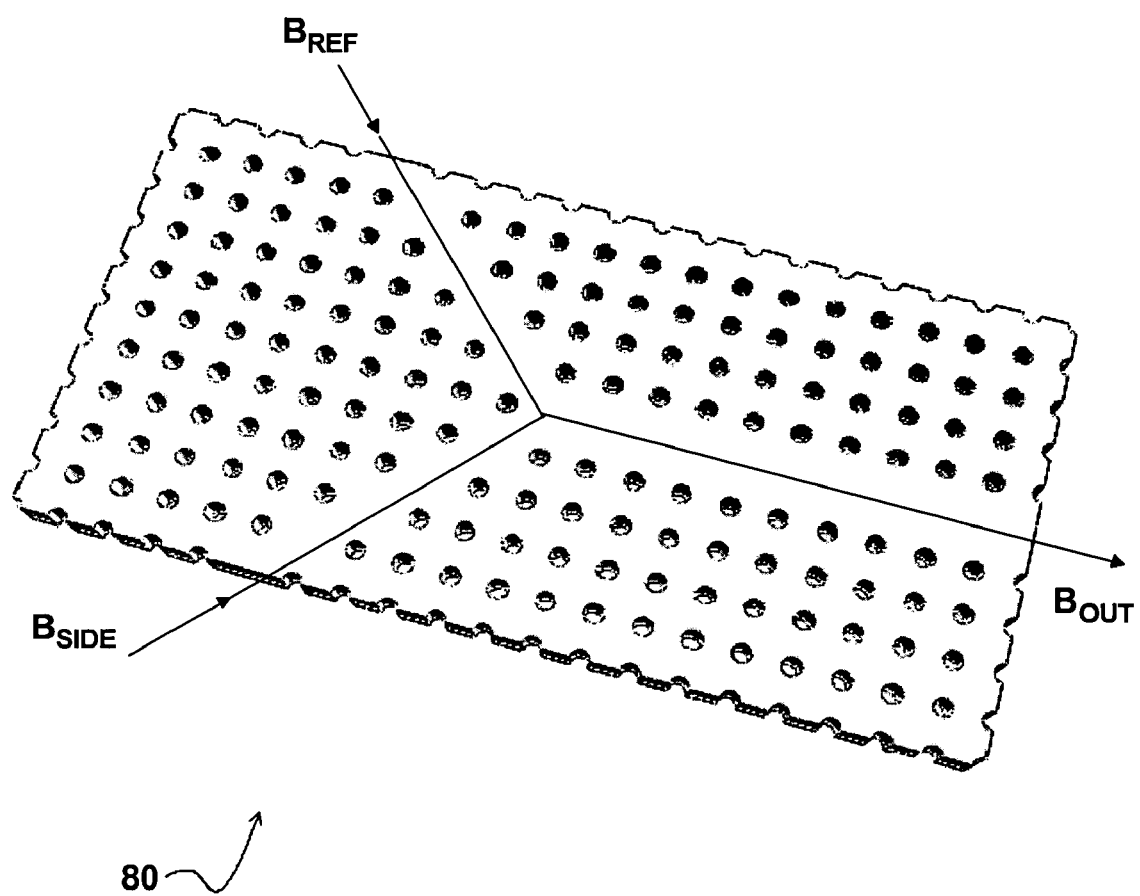
FIG. 25 shows, by way of example, an optical combiner implemented on a substrate using periodic structures.

Referring to FIG. 25, also optical splitters or optical combiners may be implemented by microstructures.

The signal processing device 100 may further comprise light-amplifying means to amplify the input signal $B_{IN}$, the output signal $B_{OUT}$, the sideband signal $B_{SIDE}$ and/or the reference signal $B_{REF}$. The light amplifying means may be implemented by e.g. rare-earth doped materials or waveguides. The light amplifying means may be a semiconductor optical amplifier.

The signal processing device 100 may be used in combination with optical data receivers, repeaters, transponders or other type of devices used in fiber optic networks. The signal processing device 100 may be used in combination with optical data receivers, repeaters, transponders or other type of devices used in optical communications systems operating in free air or in space.

The optical input signal $B_{IN}$ or the optical primary input signal $B_{IN1}$ may comprise data sent at several optical channels, i.e. associated with different reference wavelengths.

Wavelengths for optical channels in fiber optic networks have been standardized e.g. by the International Telecommunication Union within the United Nations System. The separation between two reference wavelengths ($\lambda_{0,A}$, $\lambda_{0,B}$) may be e.g. 100 GHz in the frequency domain.

The signal processing device 100 and the method according to the present invention may be used to process simultaneously, i.e. parallel in time domain, a plurality of optical signals having different reference wavelengths and/or data rates and/or different formats of modulation.

The optical input signal coupled to the signal processing device may be amplitude-modulated, phase-modulated, quadrature-modulated or modulated according to a further format known by the person skilled in the art. The primary optical input signal may comprise several modulated data signals at different wavelengths, i.e. at different optical channels. The data signals may be modulated in different ways. The data rates associated with the different data signals may be different.

A data signal may also have other modulation frequencies than the clock frequency. Also the further frequencies may be processed by the first and the second optical resonators, and recovered by selecting at least two respective spectral components of said data signal. For example, a data signal may have a clock frequency 40 GHz, but it may also have modulation at a lower frequency 10 GHz. Also the lower frequency 10 GHz may be recovered, instead of the clock frequency 40 GHz. This type of sub-harmonic all-optical recovery may be used in synchronization of optical time division multiplexing (ODTM) systems.

For the person skilled in the art, it will be clear that modifications and variations of the optical signal processing devices and methods according to the present invention are perceivable. The particular embodiments described above with reference to the accompanying drawings and tables are illustrative only and not meant to limit the scope of the invention, which is defined by the appended claims.

The invention claimed is:

1. A device for processing of an optical input signal, which optical input signal comprises at least a first data signal, said device comprising:
   a first optical resonator to provide a reference signal by optical filtering of said optical input signal, said first optical resonator being matched with a predetermined reference wavelength of said first data signal,
   a second optical resonator to provide a sideband signal by optical filtering of said optical input signal, said second optical resonator being non-matched with said predetermined reference wavelength of said first data signal, and
   an optical combiner to combine said sideband signal with said reference signal to form an optical output signal,
   wherein said device is configured:
   to couple said first data signal to a first side of said first optical resonator,
   to couple said reference signal out of a second side of said first optical resonator,
   to couple said first data signal to a first side of said second optical resonator, and
   to couple said sideband signal out of a second side of said second optical resonator.

2. The device according to the claim 1, wherein said device is adapted to recover at least a first clock frequency associated with said first data signal, one pass band of said second optical resonator being substantially matched with a first spectral component of said optical input signal, which first spectral component is associated with the clock frequency of said first data signal.

3. The device according to the claim 2, wherein said device is adapted to recover a second clock frequency associated with a second data signal, one pass band of said second optical resonator being substantially matched with a second spectral component of said optical input signal, which second spectral component is associated with the clock frequency of the second data signal.

4. The device according to the claim 1, further comprising:
   a spectral demultiplexer to separate from said optical output signal spectral components associated with said first data signal.

5. The device according to the claim 1, wherein the time constant of said optical resonators is greater than or equal to an average time period during which a state of said first data signal does not change.

6. The device according to the claim 1, wherein the wavelength position of at least one pass band of said second resonator is adjustable such that the at least one pass band may be adjusted to coincide with a sideband wavelength of said first data signal.

7. The device according to the claim 3, wherein the separation range of said second resonator is adapted such that the separation between the reference wavelength of the first data signal and the reference wavelength of a second data signal is substantially equal to the separation range of said second resonator multiplied by an integer number.

8. The device according to the claim 1, wherein at least one of said first or said second resonator comprises an optical cavity defined by at least two reflectors.

9. The device according to the claim 1, wherein at least one of said first or said second resonator is selected from the group of a micro ring resonator, a sphere resonator and a toroid resonator.

10. The device according to the claim 1, wherein at least one of said first or said second resonator comprises several optical resonators which are coupled together.

11. The device according to the claim 1, wherein at least one of said first or said second resonator comprises at least one periodic structure.

12. The device according to the claim 1, wherein at least one of said first or said second resonator comprises a closed optical loop to which light is coupled by evanescent coupling.

13. The device according to the claim 1, further comprising:
   a control configured to control the relative contribution of the reference signal with respect to the sideband signal.

14. The device according to the claim 1, further comprising:
   a control configured to control the polarization of the reference signal with respect to the polarization of the sideband signal.

15. The device according to the claim 1, wherein the polarization of the sideband signal is adapted to be substantially parallel to the polarization of the reference signal.

16. The device according to the claim 1, wherein the combiner is selected from the group of a semitransparent reflector, a bifurcated optical fiber element, an Y-coupler, a directional coupler, a filter, a grating based coupler, a polarizer and a spatial multiplexer.

17. The device according to the claim 1, further comprising:
   an output stabilization unit to provide an output signal which is stabilized with respect to the beat amplitude.

18. The device according to the claim 1, further comprising:
   an output stabilization unit to stabilize the waveform of the output signal.

19. The device according to the claim 18, wherein said intensity stabilizing unit comprises an optical resonator exhibiting optical bistability.

20. The device according to the claim 18, wherein said intensity stabilizing unit comprises an optically saturable element.

21. The device according to the claim 18, wherein said intensity stabilizing unit comprises a semiconductor optical amplifier.

22. The device according to the claim 1, further comprising:
   a polarization controlling element to control the polarization of the optical input signal, said polarization controlling element consisting of one or more components selected from the group of fiber-based polarization controller, set of waveplates, Wollaston prism, Glan-Focault polarizer, Nicol prism, Rochon prism, polarizer comprising dielectric coating, wire grid polarizer, polymer-based film polarizer, fiber transmitting single polarization mode only, and photonic crystal polarization separator.

23. The device according to the claim 1, further comprising:
   a pre-processing unit to generate one or more further spectral components based on an optical primary signal.

24. The device according to the claim 23, wherein said pre-processing unit is adapted to process an optical primary signal modulated according to the non-return-to-zero format.

25. The device according to the claim 23, wherein said pre-processing unit comprises:
- a delay line to provide a delay signal by delaying said primary signal, and
- an optical combiner to provide an exclusive-OR function of said delay signal and said primary signal.

26. A method for processing of an optical input signal, which optical input signal comprises at least a first data signal, said method comprising:
- optical filtering of said optical input signal by using a first optical resonator to provide a reference signal, said first optical resonator being substantially matched with a predetermined reference wavelength of said first data signal,
- optical filtering of said optical input signal by using a second optical resonator to provide a sideband signal, said second optical resonator being substantially non-matched with said predetermined reference wavelength of said first data signal,
- optically combining said reference signal with said sideband signal to form an optical output signal,
- coupling said first data signal to a first side of said first optical resonator,
- coupling said reference signal out of a second side of said first optical resonator,
- coupling said first data signal to a first side of said second optical resonator, and
- coupling said sideband signal out of a second side of said second optical resonator.

27. The method according to the claim 26, further comprising:
- recovering at least a first clock frequency associated with said first data signal,
- substantially matching one pass band of said second optical resonator with a first spectral component of said optical input signal, and
- associating said first spectral component with the clock frequency of the first data signal.

28. The method according to the claim 27, wherein said optical input signal further comprises a second data signal, said method further comprising:
- recovering a second clock frequency associated with the second data signal,
- substantially matching one pass band of said second optical resonator with a second spectral component of said optical input signal, and
- associating said second spectral component with the clock frequency of the second data signal.

29. The method according to the claim 26, further comprising:
- spectrally separating from said output signal spectral components associated with the first data signal.

30. The method according to the claim 26, wherein the time constant of the first optical resonator is greater than or equal to the average time period during which the state of said first data signal remains unchanged.

31. The method according to the claim 26, further comprising:
- adjusting the position of at least one pass band of the second resonator such that the at least one pass band coincides with at least one sideband of said first data signal.

32. The method according to the claim 26, further comprising:
- monitoring the spectral position of the reference wavelength with respect to at least one pass band of the first optical resonator,
- sending control information to an optical transmitter, said transmitter being adapted to transmit the first data signal, said control information being based on said spectral position, and
- tuning the spectral position of the first data signal based on said control information.

33. The method according to the claim 26, wherein the spectral position of the reference wavelength is tuned such that spectral position substantially coincides with said at least one pass band of the first optical resonator.

34. The method according to the claim 26, wherein said first data signal is amplitude modulated.

35. The method according to the claim 26, wherein said first data signal is phase-modulated.

36. The method according to the claim 26, wherein said first data signal is modulated according to the return-to-zero format.

37. The method according to the claim 26, wherein further comprising:
- pre-processing of an optical primary signal to generate further frequencies.

38. The method according to the claim 37, wherein said primary signal comprises at least one data signal which is modulated according to the non-return-to-zero format, at least one of said further frequencies being associated with the clock frequency of the non-return-to-zero modulated data signal.

39. The method according to the claim 37, wherein said pre-processing comprises:
- providing a delay signal by delaying said primary signal, and
- providing an optical signal based on exclusive-OR function of said delay signal and said primary signal.

40. The method according to the claim 26, wherein said first data signal is modulated according to the carrier suppressed return-to-zero format.

41. The method according to the claim 28, wherein the difference between the reference wavelength of the first data signal and the reference wavelength of the second data signal is substantially equal to the separation range of the second resonator multiplied by an integer number.

42. The method according to the claim 28, wherein the separation between the reference wavelength of the first data signal and the reference wavelength of the second data signal is selected according to a standard set for optical telecommunications channels in fiber optic networks by the International Telecommunication Union within the United Nations System.

43. The method according to the claim 28, wherein the separation between the reference wavelength of the first data signal and the reference wavelength of the second data signal substantially correspond to an integer multiple of the frequency 100 GHz in the frequency domain.

44. The method according to the claim 28, wherein the first data signal and the second data signal are modulated according to a different format.

45. The method according to the claim 28, wherein the first data signal and the second data signal have different clock frequencies.

* * * * *

UNITED STATES PATENT AND TRADEMARK OFFICE
CERTIFICATE OF CORRECTION

PATENT NO.         : 7,574,143 B2                                                            Page 1 of 1
APPLICATION NO.    : 11/219802
DATED              : August 11, 2009
INVENTOR(S)        : Tuomo Von Lerber It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 832 days.

Signed and Sealed this

Seventh Day of September, 2010

David J. Kappos
*Director of the United States Patent and Trademark Office*